(12) United States Patent
Ku

(10) Patent No.: US 8,266,004 B2
(45) Date of Patent: Sep. 11, 2012

(54) METHOD AND SYSTEM FOR EFFICIENTLY RELAYING MERCHANDISE DEAL THROUGH PUBLIC ASSESSMENT IN ON-LINE MARKET

(75) Inventor: Young Bae Ku, Seoul (KR)

(73) Assignee: eBay Korea Co., Ltd., Seoul (KR)

( * ) Notice: Subject to any disclaimer, the term of this patent is extended or adjusted under 35 U.S.C. 154(b) by 169 days.

(21) Appl. No.: 12/677,043

(22) PCT Filed: Aug. 27, 2008

(86) PCT No.: PCT/KR2008/005017
§ 371 (c)(1),
(2), (4) Date: May 3, 2010

(87) PCT Pub. No.: WO2009/035223
PCT Pub. Date: Mar. 19, 2009

(65) Prior Publication Data
US 2010/0325013 A1  Dec. 23, 2010

(30) Foreign Application Priority Data

Sep. 12, 2007  (KR) .................. 10-2007-0092704

(51) Int. Cl.
*G06Q 30/00* (2006.01)
(52) U.S. Cl. .................................... 705/26.1
(58) Field of Classification Search .............. 705/26.1
See application file for complete search history.

(56) References Cited

U.S. PATENT DOCUMENTS

2002/0099643 A1  7/2002  Abeshouse et al.
2003/0033215 A1*  2/2003  Habiby et al. ............... 705/26
2003/0041011 A1  2/2003  Grey et al.
2005/0234801 A1  10/2005  Zhang et al.
2006/0253334 A1*  11/2006  Fukasawa .................. 705/26

FOREIGN PATENT DOCUMENTS

KR  20000054408 A  9/2000
WO  0229672 A2  4/2002

OTHER PUBLICATIONS

MetalSite Launches QuoteFinder; The Most Advanced RFQ on the Internet; PR Newswire. New York: Sep 5, 2000. p. 1; http://proquest.umi.com/pqdweb?did=59427208&sid=2&Fmt=3&clientId=19649&RQT=309&VName=PQD.*

* cited by examiner

*Primary Examiner* — Mila Airapetian
(74) *Attorney, Agent, or Firm* — The Webb Law Firm

(57) ABSTRACT

Provided are an electronic commerce method and system that are capable of collecting information on a variety of goods or quotations in broad, intermediate, and narrow categories corresponding to attributes of goods that a buyer requests according to his or her needs, and managing the information in a database. The method and system are also capable of enabling a buyer to read and refer to quotation history, including quotation requests or process details for goods or services, and suggest appropriate price and conditions in a process of requesting a quotation. The method and system are also capable of enabling a plurality of verified sellers to respond to the quotation request, by storing, processing, and publishing the quotation history, such that the seller can obtain online sales routes at low cost and the buyer can purchase desired goods or services at a better price and under better conditions due to competition among sellers.

17 Claims, 7 Drawing Sheets

[Fig. 1]
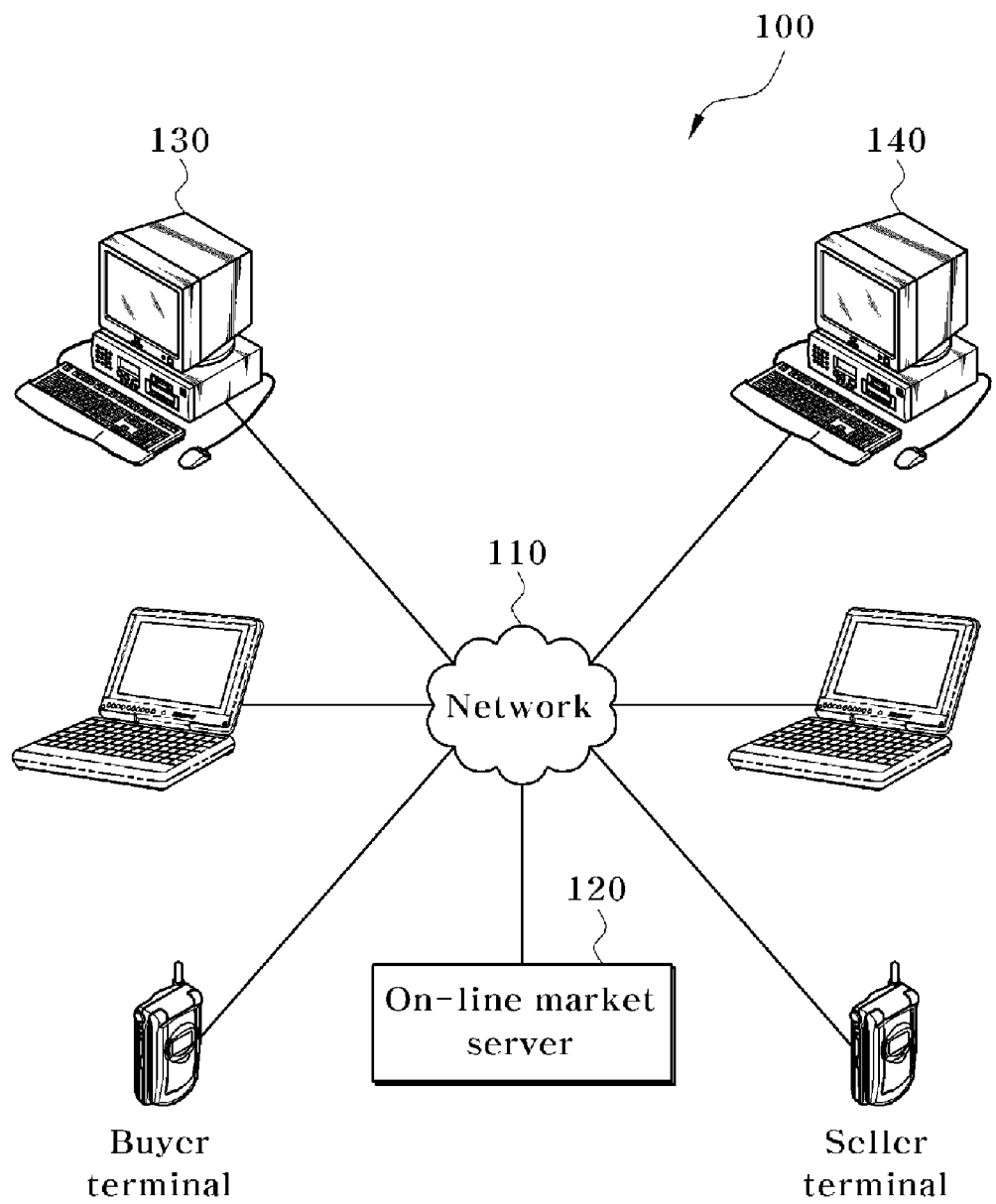

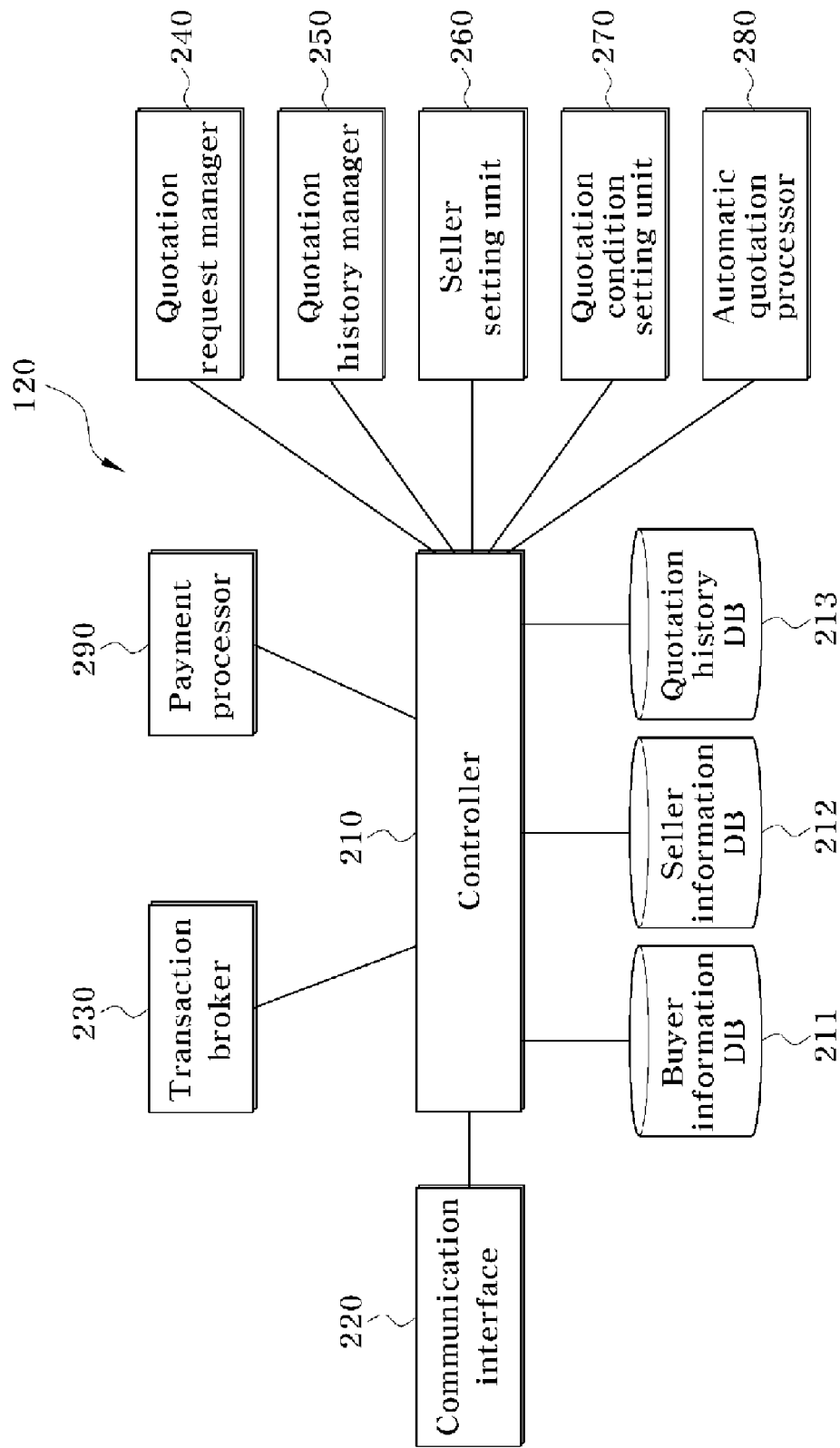

[Fig. 3]

☐ Quotation History

| Sellers | Buyers | Quotation request information (including re-quotation request) | Quotation request refusal/ acceptance information | Quotation refusal/payment information | Buyer evaluation information |
|---|---|---|---|---|---|
| Travel agency A | AAA | ☑ | | | |
| Travel agency A | BBB | ☑ | ☑ | ☑ | ☑ |
| Tour C | CCC | ☑ | ☑ | | |
| Tour D | DDD | ☑ | | | |
| ‥‥ | ‥‥ | ‥‥ | ‥‥ | ‥‥ | ‥‥ |

[Fig. 4]

☐ Quotation Request

☒ Name: Hong Gil-Dong   [Detailed information]

☒ Requirements

Price: Below [500,000]

Conditions: [Jeju-do round-trip ticket
   Two days at first-class hotel
   Dates: Sep. 1 ~ Sep. 3]

☒ Seller Setting   [Needless Setting]

1. Manager Designation
      A Travel agency ☑   B Travel agency ☑   C Tour ☑
      D Tour ☑   E Travel agency ☐
   2. Portfolio of Goods: [        ] Above
   3. Seller Reliability: [        ] Above ☒ Options of Goods   ☐ Direct Input Person ☐   (including babies) ☐

Airline   A airline ☐   B airline ☐   C airline ☐
   Hotel     Silla ☐       Hyatt ☐        Lotte ☐
   Dates  ☐☐Y ☐☐M ☐☐D ~ ☐☐Y ☐☐M ☐☐D Boarding  Depart: 06~11☐, 11~16☐, 16~21☐
   Time      Return: 06~11☐, 11~16☐, 16~21☐

Car Rental  Small ☐, Middle ☐, High-class ☐, Van ☐

[Request]

[Fig. 5]

☐ Quotation request list

| Buyers | Buyer reliability information | Contact information | Destination | Automatic quotation |
|---|---|---|---|---|
| AAA [Detailed information] | +10 | XXXX-XXXX-XXXX | Jeju-do | ☑ |
| BBB [Detailed information] | +20 | XXXX-XXXX-XXXX | Jeju-do | ☑ |
| CCC [Detailed information] | -8 | XXXX-XXXX-XXXX | Pusan | ☑ |
| ····· | ····· | ····· | ····· | ····· |

[Fig. 6]

☐ Quotation

This is a guide to a quotation requested by Hong Gil-Dong

Price: 420,000 Won X Number of Persons = XXXXXXX Won

Dates: Sep. 1 ~ Sep. 3

Airline: A Airline

Boarding Time:  Departure: 09:50

Return　　: 12:10

Hotel: XXX hotel

Description of C tour goods and
content of public relations ----

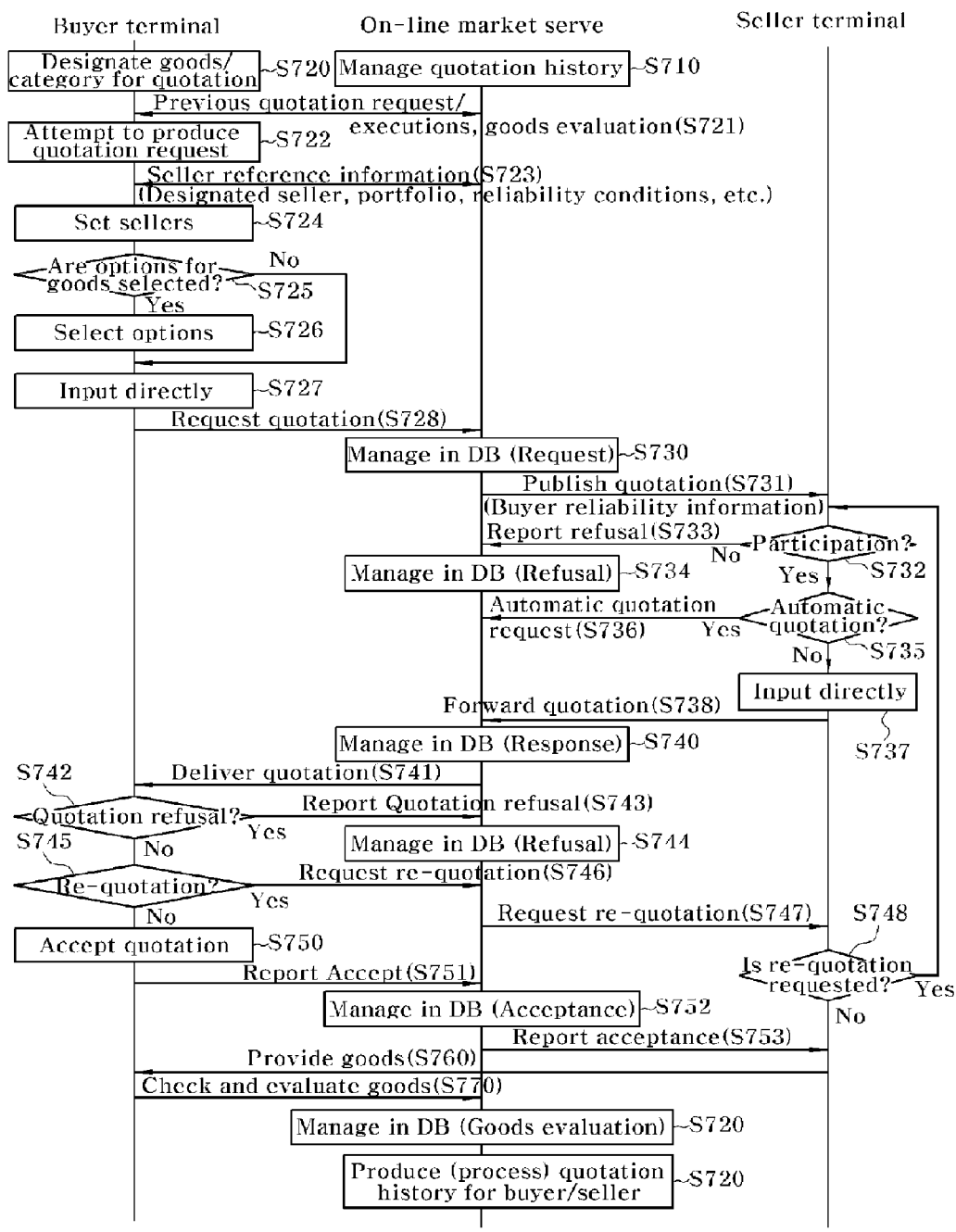

METHOD AND SYSTEM FOR EFFICIENTLY RELAYING MERCHANDISE DEAL THROUGH PUBLIC ASSESSMENT IN ON-LINE MARKET

TECHNICAL FIELD

The present invention relates to a method and system for brokering transaction of goods via a medium such as the Internet, and more particularly, to a method and system for electronic commerce that are capable of, through a server brokering transaction of goods, collecting information on a variety of goods or quotations in broad, intermediate, and narrow categories corresponding to attributes of goods that a buyer requests according to his or her needs and managing the information in a database. The method and system for electronic commerce are also capable of enabling a buyer to read and refer to quotation history, including quotation requests or process details for goods or services, and suggest an appropriate price and conditions in a process of requesting a quotation, and enabling a plurality of verified sellers to respond to the quotation request, by storing, processing, and publishing the quotation history, such that the sellers can obtain online sales routes at low cost and the buyer can purchase desired goods or services at a better price and under better conditions due to competition among the sellers.

BACKGROUND ART

Nowadays, there are many shopping malls that manage electronic commerce, such as by brokering the trading of goods or services on the Internet. The on-line shopping malls enable buyers at home to conveniently purchase a variety of goods or services registered by sellers.

Brokerage methods used in on-line shopping malls include a method by which buyers select and purchase goods or services for which a price and conditions are registered by sellers, and an auction or reverse-auction method. The auction is advantageous to sellers because goods or services are sold to a highest bidding buyer, and the reverse auction is advantageous to buyers because goods or services are sold to a lowest bidding seller.

Accordingly, the auction is not conducive to transactions at a price and conditions that are advantageous to buyers and thus it is not easy to induce many bids by buyers. Meanwhile, the reverse auction is not conducive to transactions at a price and conditions that are advantageous to sellers and thus it is not easy to induce many bids by sellers.

A combination of the auction and the reverse auction is used to overcome their shortcomings. For example, a buyer can negotiate for a different price or conditions than suggested by a seller and purchase goods at the resulting price and conditions. When the negotiation is unsuccessful, the buyer can attempt to negotiate with other sellers for purchase of desired goods. A scheme by which a buyer registers a purchase request, a plurality of sellers make a bid, and the buyer negotiates with the sellers one by one is disclosed in Korean Patent Laid-open Publication No. 10-2000-54408.

However, in such a combined scheme, failure to negotiate a price and conditions between a buyer and a seller may cause unnecessary indirect costs associated with a transaction process. Accordingly, there is a need for on-line shopping malls enabling both buyers and sellers to advantageously use electronic commerce at no extra charge, particularly, for goods or services that cannot easily be traded on-line due to properties of markets and goods or related laws. Such shopping malls should allow the buyer to come up with an appropriate quotation based on a published quotation history and allow verified sellers to provide quotations rapidly and effectively in competition with one another.

DISCLOSURE OF INVENTION

Technical Problem

An object of the present invention is to provide an electronic commerce method and system for enabling a buyer to read and refer to a quotation history, such as quotation requests or process details for goods or services, and suggest an appropriate price and conditions in a process of requesting a quotation, and for enabling a plurality of verified sellers to respond to the quotation request rapidly and effectively, by storing, processing, and publishing the quotation history through an on-line market server that brokers transaction of goods, such that the sellers can obtain online sales routes at low cost and the buyer can purchase desired goods or services at a better price and under better conditions due to competition among the sellers.

Another object of the present invention is to provide an electronic commerce method and system that are capable of collecting and managing information on a variety of goods or quotations in broad, intermediate, and narrow categories corresponding to attributes of goods that the buyer requests according to his or her needs, by continuously updating and managing, in a database, quotation information provided by a seller in response to a quotation request with attributes of goods from a buyer.

Yet another object of the present invention is to provide an electronic commerce method and system for enabling a buyer to suggest an appropriate quotation based on a quotation history published on an on-line market, for enabling verified sellers to provide quotations rapidly and effectively in competition with one another, and for enabling buyers and sellers to advantageously use electronic commerce at no extra charge, thereby fostering widespread electronic commerce for all purchasable goods and services, including those that cannot easily be traded on-line due to properties of markets and goods or related laws.

Technical Solution

According to an aspect of the present invention, a method for providing electronic commerce through a quotation request and response for merchandise (e.g., goods or services) includes: providing quotation history information for the merchandise stored in a database, in response to a request for the quotation history; providing seller reference information related to the merchandise when attempting to produce a quotation request with form and content based on the quotation history information; and receiving the quotation request including a seller setting based on the seller reference information, publishing the quotation request, and brokering negotiation with a buyer for a quotation from a seller responding to the published quotation request.

According to another aspect of the present invention, a method for providing electronic commerce through a quotation request and response for merchandise includes: receiving a quotation request from a buyer terminal and publishing the quotation request; and brokering negotiation with a buyer based on a quotation from a seller terminal responding to the quotation request, wherein: the quotation request and quotation history information related to the quotation are managed in a database and provided for buyer reference in producing subsequent quotation requests, the quotation request includes a seller setting for seller designation, and when the quotation request is provided to the seller terminal, buyer reliability information based on the quotation history information is also provided for seller reference in producing a quotation.

According to yet another aspect of the present invention, an on-line market system includes an on-line market server for supporting electronic commerce on the Internet, wherein: the on-line market server includes a controller for brokering electronic commerce based on a quotation request including a seller setting from a buyer terminal and a quotation from a seller terminal responding to the quotation request, and the controller manages the quotation request and quotation history information related to the quotation in a database for buyer reference in producing subsequent quotation requests, and provides to the seller terminal buyer reliability information based on the quotation history information together with the quotation request for seller reference in producing a quotation.

According to still another aspect of the present invention, an on-line market system that supports electronic commerce includes: a quotation history manager for providing quotation history information for merchandise stored in a database, in response to a request for a quotation history for the merchandise; a seller setting unit for providing seller reference information related to the merchandise when producing a quotation request is attempted with form and content based on the quotation history information; and a quotation request manager for receiving the quotation request including a seller setting based on the seller reference information, publishing the quotation request to relevant sellers, and managing negotiation with a buyer for a quotation from a seller.

When the quotation request manager provides the quotation request to a seller terminal, the quotation history manager may provide to the seller terminal buyer reliability information based on quotation history information for other goods or services.

The system may further include a quotation condition setting unit for providing, to the quotation request, an input field for at least one of a price of merchandise (goods or services), directly input quotation conditions, and selection options when there is an attempt to produce the quotation request by the buyer terminal.

The system may further include an automatic quotation processor for automatically producing a quotation when the quotation request includes quotation conditions selected on the field for the selection option and there is an automatic request for quotation from a seller terminal.

Advantageous Effects

According to the electronic commerce method and system of the present invention, the buyer can read and refer to the quotation history, including quotation requests or process details for goods or services, and suggest an appropriate price and conditions in a process of requesting a quotation, and a plurality of verified sellers can respond to the quotation request rapidly and effectively, by storing, processing, and publishing the quotation history through the server that brokers transactions of goods.

According to the electronic commerce method and system of the present invention, the quotation information provided by a seller in response to a quotation request with attributes of goods from a buyer can be continuously updated and managed in the database. This allows for collection of information on a variety of goods or quotations in broad, intermediate, and narrow categories corresponding to attributes of goods that the buyer requests according to his or her needs.

According to the electronic commerce method and system of the present invention, the buyer and the seller can advantageously use electronic commerce at no extra charge, and a potential customer can be directly connected with a goods specialist at a seller side, thereby reducing the overall cost of shopping in an on-line market, including the time and effort required to perform tasks such as goods searching, comparison, determination, and the like, and guaranteeing better satisfaction and usefulness of shopping results. This fosters widespread electronic commerce for all merchandise, including goods or services that cannot easily be traded on-line due to properties of markets and goods or related laws.

According to the electronic commerce method and system of the present invention, sellers can obtain online sales routes for all merchandise, such as goods and services, at low cost, and buyers can purchase desired goods or services at a better price and under better conditions due to competition among sellers.

According to the electronic commerce method and system of the present invention, the seller can reduce a burden of marketing and provide appropriate goods or services according to the buyer-requested quotation conditions and the buyer reliability. This results in easy stock management and coping with buyer demands. The buyer can suggest a quotation under appropriate conditions and at an appropriate price by referring to quotations of other buyers, and can review and accept a quotation, resulting in reduced indirect costs, including transaction time, and resolving issues of quotation result verification and reliability.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain principles of the invention.

FIG. 1 illustrates an on-line market system according to an exemplary embodiment of the present invention;

FIG. 2 is a block diagram illustrating an on-line market server according to an exemplary embodiment of the present invention;

FIG. 3 illustrates a diagram for explaining reading a quotation history according to an exemplary embodiment of the present invention;

FIG. 4 illustrates a quotation request from a buyer according to an exemplary embodiment of the present invention;

FIG. 5 illustrates a quotation request list on a seller screen according to an exemplary embodiment of the present invention;

FIG. 6 illustrates a quotation from a seller according to an exemplary embodiment of the present invention; and FIG. 7 is a flowchart illustrating operation of an on-line market system according to an exemplary embodiment of the present invention.

MODE FOR THE INVENTION

The present invention will now be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be sufficiently thorough and complete to fully enable those skilled in the art to embody and practice the invention. Like reference numerals refer to like elements throughout the drawings and specification.

FIG. 1 illustrates an on-line market system 100 according to an exemplary embodiment of the present invention. Referring to FIG. 1, the on-line market system 100 according to an exemplary embodiment of the present invention may include a network 110, an on-line market server 120, a buyer terminal 130, and a seller terminal 140.

Here, the network 110 may be wired or wireless Internet. Alternatively, the network 110 may be a core network integrated with a wired public network, a wireless mobile network, or mobile Internet. The on-line market server 120 is a server that operates an on-line shopping mall over the network 110 and brokers general sale, auction, reverse auction, negotiation, and the like for goods or services between sellers and buyers. The on-line market server 120 registers a variety of goods or services of the sellers received from the seller terminal 140 over the network 110, and provides the registered goods or services to the buyer terminal 130 over the network 110, so that a buyer can purchase desired goods or services. In particular, the on-line market server 120 may also support electronic commerce through a quotation request for merchandise (e.g., goods or services) from the buyer and a response from the seller, as described below, and may collect and manage information on a variety of goods or quotation information in broad, intermediate, and narrow categories corresponding to attributes of goods that the buyer requests according to his or her needs.

Here, the merchandise (goods or services) may not only include goods or services having general brands, but also goods such as handicrafts made at home, returned discounted goods, used goods, co-purchased goods and the like, and services intellectual or physical, such as interior construction, general construction, building, legal services and the like, which cannot easily be traded on-line due to properties of markets and goods or related laws.

The on-line market server 120 may also process payment for an object that the buyer selects from a list of merchandise, provide payment information to the seller so that the object can be delivered to the buyer, and provide a location tracking service for the object and a tracking-result inquiry service.

The buyer terminal 130 and the seller terminal 140 generally are computers, such as desktop personal computers (PCs) or notebook PCs, but are not limited thereto. For example, the buyer terminal 130 and the seller terminal 140 may be any kind of wired or wireless communication devices that can use bidirectional electronic commerce service by accessing the on-line market server 120 over the network 110. For example, the buyer terminal 130 and the seller terminal 140 may be mobile terminals such as cellular phones, Personal Communications Services (PCS) phones, and synchronous/asynchronous International Mobile Telecommunication (IMT)-2000 terminals that are in communication via wireless or mobile Internet. Alternatively, the buyer terminal 130 and the seller terminal 140 may be any wired and wireless customer electronics/communication devices having a user interface for accessing the on-line market server 120, such as palm PCs, Personal Digital Assistants (PDAs), smart phones, Wireless Application Protocol (WAP) phones, and mobile game machines (e.g., mobile playstations).

In particular, to support electronic commerce through a quotation request and response for merchandise, the on-line market server 120 may open the quotation request to only a plurality of verified sellers depending on a seller setting when receiving the quotation request, including the seller setting for seller designation, from the buyer terminal 130. Accordingly, the on-line market server 120 may receive quotations from the seller terminal 140 of sellers who desire to provide the goods or service in response to the quotation request, and provide the quotations to the buyer terminal 130 for brokerage of negotiation with the buyer.

In this case, the on-line market server 120 may manage quotation history information related to the quotation request from the buyer and the quotation from the seller in the database and provide the quotation history information for reference by the buyer terminal 130 in making subsequent quotation requests. The buyer may refer to the related quotation history information upon attempting to produce a quotation request. This allows him or her to request the quotation through the quotation request including an appropriate price and conditions. When there is no history information in the database, the on-line market server 120 continuously updates, stores and manages the quotation from the seller in the database in response to the quotation request with attributes of goods from the buyer, to collect and manage information on a variety of goods or quotations in broad, intermediate, and narrow categories corresponding to attributes of goods that the buyer requests according to his or her needs. The on-line market server 120, when providing the quotation request from the buyer to the seller terminal 140, may also provide buyer reliability information based on the quotation history information for other goods or services so that the seller can refer to the buyer reliability information for quotation production.

Thus, the on-line market server 120, which brokers the electronic commerce for merchandise, stores, processes, and publicizes the quotation history, such as quotation requests or process details for goods or services, such that the buyer can read and refer to the quotation history and suggest an appropriate price and conditions in a process of requesting a quotation and a plurality of verified sellers can respond to the quotation request rapidly and effectively.

Thus, the on-line market server 120 enables sellers to obtain online sales routes for all merchandise such as goods and services at low cost, and enables buyers to purchase desired goods or services at a better price and under better conditions due to competition among the sellers.

FIG. 2 is a detailed block diagram illustrating the on-line market server 120 according to an exemplary embodiment of the present invention. Referring to FIG. 2, the on-line market server 120 according to an exemplary embodiment of the present invention includes a controller 210, a buyer information database (DB) 211, a seller information DB 212, a quotation history DB 213, a communication interface 220, a transaction broker 230, a quotation request manager 240, a quotation history manager 250, a seller setting unit 260, a quotation condition setting unit 270, an automatic quotation processor 280, and a payment processor 290.

The controller 210 is a processor for basically controlling goods registration by sellers, goods purchase by buyers, and delivery of paid goods, and for additionally performing general control of the above components of the on-line market server 120, in order to provide electronic commerce service brokering transaction of goods or services between sellers and buyers. In order to support electronic commerce through a quotation request and response for merchandise according to the present invention, the controller 210 controls electronic commerce brokerage based on a quotation request with a seller setting from the buyer terminal 130 and a quotation from the seller terminal 140 in response to the quotation request. The controller 210 may manage quotation history information related to the quotation requests and corresponding quotations, in the quotation history DB 213, for reference by the buyer terminal 130 in making subsequent quotation requests. When there is no history information managed in the quotation history DB 213, the controller 210 may control storing and managing of the quotation information from the sellers in the quotation history DB 213 in response to quotation requests with attributes of goods from the buyer, by continuously updating the quotation information. The on-line market server 120 may collect information on a variety of goods or quotations in broad, intermediate, and narrow categories corresponding to attributes of goods that the buyer requests according to his or her needs, and may manage the information in the quotation history DB 213.

The controller 210, when providing the quotation request from the buyer to the seller terminal 140, may also provide buyer reliability information based on the quotation history information for other goods or services so that the seller can refer to the buyer reliability information for quotation production.

The seller terminal 140 may access the on-line market server 120 over the network 110 and use transaction brokerage service for goods or services provided by the on-line market server 120 via wired or wireless communication made by the communication interface 220. The seller may subscribe to the service provided by the on-line market server 120 using the seller terminal 140. Seller information registered by the subscribed seller, such as a seller ID, a password, contact information, price of goods for sale, brands of goods, features of goods, and the like, is stored in the seller information DB 212. Selection option fields that will be used to produce a quotation request for the registered goods or services may also be managed in the seller information DB 212. The selection option fields are provided for easy and efficient information exchange, such as automatic quotation processing, between sellers and buyers, as described with respect to FIG. 4. The selection option fields may be managed with several items so that various quotation conditions for the quotation request are selected according to features of the goods or services, instead of being directly input.

The buyer terminal 130 also may access the on-line market server 120 over the network 110 and use transaction brokerage service for goods or services provided by the on-line market server 120 via wired or wireless communication made using the communication interface 220. The buyer may subscribe to the service provided by the on-line market server 120 using the buyer terminal 130. Buyer information registered by the subscribed buyer, such as a buyer ID, a password, contact information, shopping basket information, information on bade goods, information on goods purchased by auction, goods information being negotiated, information on paid goods, delivery information, and information on whether a decision to purchase has been made are stored in the buyer information DB 211.

In order to broker transaction of goods or services registered by the seller as described above, the transaction broker 230 may provide the information on the goods or services for sale stored in the seller information DB 212 to the buyer terminal 130 through web pages, or may search for goods corresponding to a search key word input by the buyer terminal 130 based on names or contents of goods and provide a list of the goods to the buyer terminal 130 through the web pages.

When the buyer selects a payment request for immediate purchase or quotation acceptance for desired goods or services, the transaction broker 230 may provide payment screen information for the seller's merchandise to the buyer terminal 130 through web pages. The buyer selects or inputs buyer-related information (e.g., a buyer name, an ID, a telephone number, etc.), payment object information, money, delivery destination, a payment method (e.g., credit card, direct deposit, real-time funds transfer, cyber money, etc.) and the like on a screen for payment displayed on the buyer terminal 130 based on payment screen information. In response to a payment request from the buyer inputting all required information on the payment screen, the payment processor 290 performs the payment via an authentication procedure using a certificate. Unless the buyer receiving the goods or services requests return or refund of the goods or services, the payment processor 290 may calculate money according to a fee policy and send the money to a seller account after being notified of approval such as a decision to purchase from the buyer terminal 130.

Meanwhile, in order to support electronic commerce through a quotation request and response for merchandise according to the present invention, the transaction broker 230 may provide a quotation request screen including goods information and a quotation guide when the buyer terminal 130 designates goods or services for the quotation request. A tag enabling the buyer terminal 130 to request a quotation history may be included on the quotation request screen. When the buyer terminal 130 clicks on the tag, the history manager 250 may provide quotation history information for the merchandise stored in the quotation history DB 213 in response to the quotation history request for the merchandise.

The quotation history information in the quotation history DB 213 may include previous quotation request information for merchandise (goods or services) (including re-quotation request information), quotation request refusal/acceptance information, quotation refusal/acceptance information, buyer evaluation, and the like, corresponding to sellers and buyers associated with respective quotation requests and process details as in FIG. 3.

For example, when a tag for the quotation request information field of FIG. 3 is clicked on, a quotation request produced and transmitted by the buyer as shown in FIG. 4 and a related memo or additional requirements may be provided. When the seller responds with the quotation, information for re-quotation request may also be provided.

When a quotation request refusal/acceptance information field of FIG. 3 is clicked on, information for quotation request refusal or acceptance by the seller may be provided. When the quotation request from the buyer includes an unreasonable condition, the seller may ignore or refuse the quotation request. In this case, a reply or a line: "the quotation request has been refused" input on a seller screen of the seller terminal 140 may be included in the quotation request refusal/acceptance information field. When the quotation request from the buyer is attractive with respect to several conditions, the seller may respond with a quotation as shown in FIG. 6 using the seller terminal 140. In this case, the quotation as shown in FIG. 6 and other additional requirements and information input by the seller may be included in the quotation request refusal/acceptance information field.

When a tag for the quotation refusal/acceptance information field of FIG. 3 is clicked on, information for refusal or acceptance by the buyer in response to the seller quotation may be provided. In the case of the quotation being accepted, a final quotation may be agreed upon through a re-quotation request and provided.

When the quotation is canceled or accepted, the buyer receiving or using the goods or services may input his/her overall evaluation of the goods or services on a buyer screen of the buyer terminal 130. In this case, evaluation information input by the buyer may be provided in a buyer evaluation information field of FIG. 3. For example, the buyer may indicate his/her level of satisfaction with delivery, quality of goods or services, and price as Very Satisfied, Satisfied, Neutral, or Dissatisfied. The buyer evaluation information may be managed in the quotation history DB 213.

The screen shown in FIG. 3 is only an exemplary embodiment. The screen may be provided in any of various forms, including a form in which the quotation request information (including re-quotation request information), quotation request refusal/acceptance information, quotation refusal/acceptance information, and buyer evaluation information are provided on one page. Information in each field in FIG. 3 may be provided as is with seller and buyer-input content being not processed or may be provided with the content being partially processed as the case may be. For example, the quotation request shown in FIG. 4 may be provided with only "Requirements" or the quotation shown in FIG. 6 may be provided with only information except for "Description of goods and content of public relations." In addition, the manager may operate the on-line market server 120 to provide only information that may be utilized as a reference by the buyer or the seller.

In particular, the quotation history manager 250 may collect and manage, in the quotation history DB 213, various items of information that may be beneficially referred to by the buyer, based on information in the quotation form that the seller has responded to a previous quotation request for the merchandise (goods or services). That is, in response to the quotation request shown in FIG. 4, the seller may not only respond with the detailed quotation content shown in FIG. 6, but may also collect and manage information on goods or quotations that meet the buyers needs according to attributes of goods or services for which the buyer has requested quotations.

For example, the buyer may request a quotation for travel goods in a broad category, i.e., with the attribute of the goods being "travel", or in a sub category of "travel", such as "overseas travel", "domestic travel" or "honeymoon". In another example, the buyer may request a quotation on a car in a broad category, i.e., with the attribute of goods being "car," or in a sub category of "car", such as "van", "large car", or "small car".

In the above example, when the requirements are in the broad category such as "travel" or "car" and a sub category—an intermediate category or a narrow category, the seller may respond with an appropriate quotation guide. For example, in response to the quotation request in the broad category, such as "travel", the seller may respond with a quotation including price and detailed information for travel goods that he or she desires to recommend among various travel goods, such as "overseas travel", "domestic travel", and "honeymoon". In response to a quotation request in the intermediate category or the narrow category, such as "overseas travel", "domestic travel" or "honeymoon", the seller may respond with a quotation including price and detailed information on regions he or she handles, such as Europe, the United States of America, Japan, Southeast Asia, and the like in the case of "overseas travel"; Jeju-do, Mt. Seorak, Mt. Jiri, Pusan, Ulleung-do and the like in the case of "domestic travel"; and Hawaii, Guam, Saipan, Paris and the like in the case of "honeymoon". In response to a quotation request for "overseas travel" with a desired price, the seller may recommend goods matching the price among the "overseas travel" goods or goods with an explanation of their merits and demerits, reasons for recommending them, and the like.

In this manner, the quotation information from the seller in response to the quotation request with attributes of goods from the buyer is continuously updated and managed, even when there is no history information managed in the quotation history DB 213. Thus, the quotation history manager 250 may collect and manage the quotation information corresponding to attributes of goods requested by the buyer, as well as general information according to attributes of the goods.

Meanwhile, the quotation history manager 250 may also calculate seller and buyer reliabilities based on the quotation history information for merchandise (goods or services). The seller reliability may be provided for reference for seller setting in a process of requesting a quotation by the buyer. The buyer reliability may be provided for reference upon quotation refusal or acceptance by the seller. For example, the seller reliability may be classified as Power Dealer, Excellent, or Normal, or using a point system depending on information such as a number of times the seller has responded, a number of times the seller has refused, buyer evaluation, and the like. In addition, the buyer reliability may be classified as Diamond, Gold, Silver, or Copper, or using a point system depending on information such as a number of cases the buyer has purchased after sending a quotation request, price, a number of times the buyer has refused a quotation, a number of times the buyer has accepted a quotation, and the like.

Meanwhile, on the quotation request screen, the buyer may refer to the quotation history information provided by the transaction broker 230 to the buyer terminal 130, and then attempt to produce a quotation request for the goods or services. To attempt to produce the quotation request, the buyer may click on a quotation request tag on the quotation request screen, or on an existing quotation request screen which appears when clicking on each field, and particularly, on the quotation request tag shown in FIG. 3.

For example, in order to form a travel-related quotation request, the quotation condition setting unit 270 may provide a name (with an ID, contact information, an E-mail address, and the like upon clicking on detailed information) and may directly input requirements as quotation conditions (e.g., price, conditions, and the like of merchandise (goods or services)) and the like in FIG. 4 so that they are basically included in the quotation request. Alternatively, the quotation condition setting unit 270 may provide option fields (goods options) the seller has registered for selection of quotation conditions according to features of goods or services so that they are also included in the quotation request. In this case, when there is a quotation condition selected in the option field, the directly input requirement may not be needed. The on-line market server 120 may operate so that the seller or the manager can provide a free gift or points to a buyer who has selected all the conditions of the option fields for quotation.

The quotation request may include seller setting information. The quotation request may be published only to sellers verified for the goods or services, so that only such sellers can participate in the quotation. This will contribute to rapid and appropriate acceptance of the quotation by preventing repetitive re-quotation requests and responses with respect to non-verified sellers.

When the buyer attempts to produce the quotation request with a relevant form and content on the quotation request screen by referring to the quotation history information provided as described above, the seller setting unit 260 may provide seller reference information related to the merchandise to the buyer terminal 130. That is, the sellers are set based on the seller reference information provided by the seller setting unit 260, such as information for selecting sellers previously designated by the manager, sellers having a portfolio of goods or services above a predetermined level, and sellers having reliability based on the quotation history information for the goods or services above a predetermined level. Only the set sellers are allowed to participate in the quotation.

The seller reference information the seller setting unit 260 provides may be ignored by clicking on a tag "No setting needed." In this case, the quotation request may be published to all sellers. Alternatively, only some of the sellers previously designated by the manager, included in the provided seller reference information of FIG. 4, may be selected and, for example, the level may be set to above "Aircartel" (when airplane ticket, car rental, and hotel are all reserved) in association with travel goods in order to set the sellers portfolio above the predetermined level. And, the levels may be set to above "Power dealer" or above +30 points to set the sellers reliability above the pre-determined level.

When the items of information are all input for the quotation request, which is then received from the buyer terminal 130, the quotation request manager 240 manages to publish the quotation request to related sellers and to negotiate with the buyer for the quotation from the seller. For management of the publishing and negotiation by the quotation request manager 240, the payment processor 290 may pay a predetermined participation fee for the quotation request when the quotation request is transmitted by the buyer terminal 130. For example, on a payment screen on which the quotation request can be appended, the buyer may select a payment method, such as credit card, direct deposit, real-time funds transfer, or cyber money to request payment for the quotation request, such that the payment processor 290 may perform the payment via an authentication process based on a certificate.

Meanwhile, the quotation request manager 240 may provide the quotation request to the seller terminal 140 on the seller screen as shown in FIG. 5. In this case, the quotation request manager 240 may also provide buyer reliability information (e.g., "Diamond" or +20 points) based on the quotation history information for other goods or services as described above, to the seller terminal 140, so that sellers can refer to the buyer reliability information when determining whether to participate in the quotation. For example, when clicking on detailed information in a buyer item on the seller screen of FIG. 5, the seller can view the buyer's quotation request. The seller may confirm the quotation request and the buyer reliability information, produce a quotation in a predetermined form, and respond using the seller terminal 140. The quotation request manager 240 may store the quotation history information in the quotation history DB 213 while managing the buyers quotation request, the quotation refusal/acceptance by the seller, quotation refusal/acceptance by the buyer, and the like, so that they are normally performed. For example, each time the buyer terminal 130 requests a re-quotation in response to the quotation from the seller, the quotation request manager 240 may perform processing for quotation request refusal or acceptance by the seller terminal 140, and quotation refusal or acceptance by the buyer terminal 130 in response to the request.

Meanwhile, when the buyer terminal 130 attempts to produce the quotation request with the quotation conditions including selection of at least one of selection option fields provided by the quotation condition setting unit 270 as shown in FIG. 4, the seller may request to automatically produce the quotation as shown in FIG. 6 on the seller screen as shown in FIG. 5. In response to the request, the automatic quotation processor 280 may automatically produce the quotation in a predetermined form. In this case, the quotation may be stored and managed in the quotation history DB 213.

When the seller participates in the quotation by requesting to automatically produce the quotation or responding with the quotation using the seller terminal 140, the payment processor 290 may pay a predetermined participation fee. For example, on the payment screen on which the quotation can be appended or the automatic quotation can be requested, the seller may select a payment method, such as credit card, direct deposit, real-time funds transfer, or cyber money, to request payment for the quotation transmission or the automatic generation request. The payment processor 290 may perform the payment via the authentication process using a certificate.

As the on-line market server 120 provides quotation request and response service for merchandise in the above manner, buyers and sellers can advantageously use necessary electronic commerce at no extra charge, and customers can be directly connected with goods specialists at a seller side, thereby reducing the overall cost of shopping on an on-line market, including the time and effort required to perform tasks such as goods searching, comparison, determination, and the like, and guaranteeing better satisfaction and usefulness of shopping results. This fosters widespread electronic commerce for all merchandise, including goods or services that cannot easily be traded on-line due to properties of markets and goods or related laws.

Operation of the on-line market system according to an exemplary embodiment of the present invention will now be described in greater detail with reference to a flowchart of FIG. 7.

First, the on-line market server 120 manages, in the quotation history DB 213, quotation request information (including re-quotation request information), quotation request refusal/acceptance information, quotation refusal/acceptance information, and buyer evaluation information for merchandise (goods or services), as shown in FIG. 3 (S710). As described above, even when there is no history information managed in the quotation history DB 213, the on-line market server 120 collects and manages information on a variety of goods or quotations in broad, intermediate, and narrow categories corresponding to attributes of the goods that the buyer requests according to his or her needs, by continuously updating and managing information on the quotation response from the seller in response to a quotation request with attributes of goods from the buyer.

In this case, when the buyer terminal 130 designates goods or services for which the quotation is requested, the transaction broker 230 of the on-line market server 120 may provide the quotation request screen including goods information and quotation guide (S720). A tag for requesting a quotation history may be included on the quotation request screen. When the buyer terminal 130 selects the tag by the buyer clicking on it, the quotation history manager 250 of the on-line market server 120 may provide the quotation history information for the merchandise stored in the quotation history DB 213, as in FIG. 3, in response to the quotation history request for the merchandise (S721).

Thereafter, the buyer may refer to the quotation history information on the quotation request screen provided by the transaction broker 230 to the buyer terminal 130, and may attempt to produce a quotation request for the goods or services, as described above (S722). To attempt to produce a quotation request, the buyer may click on the quotation request tag on the quotation request screen or on the screen for displaying previous quotation requests, which is provided by clicking on each field as shown in FIG. 3, and particularly, on the quotation request information field.

As the buyer refers to the quotation history information provided as described above and attempts to produce the quotation request in a relevant form and content on the quotation request screen, the seller setting unit 260 of the on-line market server 120 may provide the seller reference information related to merchandise to the buyer terminal 130 (S723). That is, the sellers are set based on the seller reference information provided by the seller setting unit 260, such as information for selecting sellers previously designated by the manager, sellers having a portfolio above a predetermined level for the merchandise (goods or services), and sellers having reliability above a predetermined level based on the quotation history information for the goods or services, so that only the set sellers can participate in the quotation.

The seller reference information provided by the seller setting unit 260 may be ignored by clicking on the tag "Setting not needed" on the screen shown in FIG. 3. In this case, the quotation request may be published to all sellers. Alternatively, only some of the sellers previously designated by the manager in the provided seller reference information shown in FIG. 4 may be selected and, for example, the level may be set to above "Aircartel" (when airplane ticket, car rental, and hotel are all reserved) in association with travel goods in order to set the sellers having a portfolio above the predetermined level, and the levels may be set to above "Power dealer" or above +30 points in order to set the sellers having reliability above the predetermined level.

Thus, the quotation request is published to only sellers verified for the goods or services according to the seller setting information included in the quotation request, so that only the above sellers can participate in the quotation. This will contribute to rapid appropriate acceptance of quotation by preventing repeated requests and responses for re-quotation with non-verified sellers.

In order to form a travel-related quotation request, the quotation condition setting unit 270 may provide a name (with an ID, contact information, an E-mail address, and the like when clicking on detailed information), directly input requirements as quotation conditions (e.g., price, conditions, and the like of merchandise (goods or services)), and the like, as in FIG. 4, so that they are basically included in the quotation request. Alternatively, the quotation condition setting unit 270 may provide option fields (goods options) the seller has provided for selection of quotation conditions according to features of goods or services so that they are also included in the quotation request (S725). In this case, the buyer may select necessary quotation conditions in the option fields (S726). When the option fields are not used, the buyer may directly input price, conditions, and the like on the quotation requirement column (S727). When the quotation condition is selected in the option field, the directly input requirement may not be needed.

When the quotation request is received from the buyer terminal 130 after all items of information are input and a predetermined participation fee is paid for the quotation request (which is not necessarily needed) (S728), the quotation request manager 240 of the on-line market server 120 stores additional information including the quotation request in the quotation history DB 213 (S730), publicizes the quotation request to relevant sellers, and manages negotiation with the buyer for the quotation from the seller.

In this case, the quotation request manager 240 may provide a quotation request list to the seller terminal 140 through the seller screen as shown in FIG. 5, in response to a request for the list from the seller terminal 140. In this case, the quotation request manager 240 may also provide the buyer reliability information based on the quotation history information for other goods or service, as described above (e.g., "Diamond" or +20 points), to the seller terminal 140, so that the seller can refer to such information to determine whether to participate in the quotation production (S731). The seller can view the quotation request by clicking on detailed information in the buyer item displayed on the seller screen of FIG. 5.

The seller may refuse the quotation request or respond with a quotation produced in a predetermined form, using the seller terminal 140, by checking the quotation request and the buyer reliability information (S732~S733). Even when the seller refuses the quotation request, the quotation request manager 240 may store refusal-related information, such as a seller-input reply or a predefined line: "the quotation request has been refused", in the quotation history DB 213 (S734).

When there is an attempt to produce a quotation request from the buyer terminal 130 with the quotation conditions including a selection of at least one of the selection option fields provided by the quotation condition setting unit 270 in step S726 for the quotation request shown in FIG. 4, the seller may request to automatically generate the quotation shown in FIG. 6 through the seller screen shown in FIG. 5 (S735~S736). In response to receiving the request, the automatic quotation processor 280 of the on-line market server 120 may automatically produce the quotation in a predetermined form. In this case, the quotation may be stored and managed in the quotation history DB 213. When complex conditions obstructing automatic quotation are included by directly inputting the quotation requirements, the seller may produce and send the quotation in a predetermined form (S737~S738). The quotation request manager 240 may also store and manage the quotation provided by the seller terminal 140 in the quotation history DB 213 (S740). When the seller participates in the quotation production by requesting the automatic quotation or responding with the quotation using the seller terminal 140, the payment processor 290 of the on-line market server 120 may pay a predetermined participation fee (which is not necessarily needed).

The quotation may be delivered to the buyer terminal 130 in response to the buyer requesting the quotation on the buyer screen (S741). The buyer may refuse a non-attractive quotation and report the refusal (S742~S743). The quotation request manager 240 may store the refusal-related information, such as a buyer-input reply or a predefined line: "the quotation has been refused", in the quotation history DB 213 (S744).

When the buyer desires to modify the quotation partially, he or she may input desired conditions or additional matters on the buyer screen and request a re-quotation (S745~S746). Each time the buyer terminal 130 requests a re-quotation in response to the quotation from the seller, the quotation request manager 240 provides information related to re-quotation request to the seller terminal 140 (S747). Thereafter, the quotation request manager 240 may perform processing for quotation request refusal or acceptance by the seller terminal 140 (S732~S738) and quotation refusal or acceptance by the buyer terminal 130 in response to the re-quotation (S742~750).

When the buyer is satisfied with the quotation, he or she may accept the quotation and report the acceptance on the buyer screen (S750~S751). When the quotation is accepted, the transaction broker 230 may provide payment screen information to the buyer terminal 10, allowing the buyer to use escrow payment service. The quotation request manager 240 may store transaction-related information associated with the acceptance reported by the buyer terminal 130, such as payment information, a buyer-input reply or a predefined line: "the quotation has been accepted", and the like in the quotation history DB 213 to correspond to the quotation request and the quotation (S752).

In this manner, the transaction information responsive to the quotation may be provided on the seller screen (S753), allowing the seller to deliver goods or services related to the quotation to the buyer or to provide intellectual or physical services, such as interior construction or legal services, to the buyer (S760).

The buyer receiving and using the goods or services delivered from seller may check delivery service, a quality of the goods or services, and the like and approve purchase so that the payment processor 290 of the on-line market server 120 calculates and sends the money to the seller's account. Here, the buyer may input buyer evaluation information requested on the buyer screen (S770). The quotation request manager 240 may manage the buyer evaluation information, such as level of satisfaction with delivery, quality of goods, service, price and the like, as Very Satisfied, Satisfied, Neutral, or Dissatisfied in the quotation history DB 213 (S780).

The manager may process the quotation request information (including the re-quotation request information), the quotation request refusal or acceptance information, the quotation refusal/acceptance information, and the buyer evaluation information in the quotation history DB 213 and provide the same to the buyer terminal 130, so that the information can be referred to in the form shown in FIG. 3 when other buyers request a quotation for merchandise (goods or services) (S790).

Thus, the on-line market server 120 brokers quotation requests and responses for merchandise, allowing the seller to reduce a burden of marketing and to provide appropriate goods or services according to the buyer-requested quotation conditions and the buyer reliability. This results in easy stock management and coping with buyer demands. The buyer can suggest a quotation under appropriate conditions and at an appropriate price and review and accept a quotation by referring to the information managed in the quotation history DB 213 to check quotations of other buyers. This results in a more efficient brokerage service with reduced indirect costs including transaction time, verification of quotation results, and management of reliability results.

The method and system disclosed in this specification may be implemented as computer-readable code on a computer-readable recording medium. The computer-readable recording medium may include any of all kinds of recording devices that store computer-readable data. Examples of the computer-readable recording medium include a read-only memory (ROM), a random access memory (RAM), a compact disk-read only memory (CD-ROM), a magnetic tape, a floppy disk, and an optical data storage. Another example of the medium is carrier waves (e.g., Internet transmission). Further, the computer-readable recording medium may be distributed over networked computer systems so that the computer-readable code can be stored and executed in a de-centralized manner.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method for providing electronic commerce through a quotation request and response for merchandise, the method comprising:
   providing quotation history information for the merchandise stored in a database, in response to a request for the quotation history;
   providing seller reference information related to the merchandise when attempting to produce a quotation request with form and content based on the quotation history information; and
   receiving the quotation request with a seller setting based on the seller reference information, publishing the quotation request, and brokering negotiation with a buyer for a quotation from a seller responding to the published quotation request.

2. The method of claim 1, wherein the quotation history information comprises information obtained by collecting and managing, in the database, goods or quotation information from the seller in at least one of broad, intermediate, and narrow categories corresponding to attributes of the goods for which the buyer requests the quotation according to his or her needs.

3. The method of claim 1, wherein the quotation history information comprises information obtained by processing none or at least one of previous quotation request information, quotation request refusal/acceptance information, quotation refusal/acceptance information, and buyer evaluation information for the merchandise (goods or services).

4. The method of claim 1, wherein the seller reference information comprises information for selecting at least one of sellers previously designated by a manager, sellers having a portfolio of the goods or services above a predetermined level, and sellers having reliability above a predetermined level, the reliability being based on the quotation history information.

5. The method of claim 1, wherein the quotation request comprises at least one of a price of the goods or services, directly input quotation conditions, and quotation conditions selected on option fields.

6. The method of claim 1, wherein when the quotation request comprises quotation conditions selected on the option fields and there is an automatic request for a quotation from a seller terminal, the quotation is automatically produced.

7. The method of claim 1, wherein the quotation request, when provided to a seller terminal, comprises buyer reliability information based on quotation history information for other goods or services.

8. The method of claim 1, further comprising:
   each time there is a re-quotation request from a buyer terminal in response to the quotation, performing processing for quotation request refusal or acceptance by a seller terminal and quotation refusal or acceptance by the buyer terminal responsive to the acceptance of the request.

9. A method for providing electronic commerce through a quotation request and response for merchandise, the method comprising:
   receiving a quotation request from a buyer terminal and publishing the quotation request; and
   brokering negotiation with a buyer based on a quotation from a seller terminal responding to the quotation request,
   wherein the quotation request and quotation history information related to the quotation are managed in a database and provided for buyer reference in producing subsequent quotation requests,
   the quotation request comprises a seller setting for seller designation, and
   when the quotation request is provided to the seller terminal, buyer reliability information based on the quotation history information is also provided for seller reference in producing a quotation.

10. The method of claim 9, further comprising, following the brokering:
    performing payment of a relevant price when the buyer terminal accepts the quotation, and calculating money according to a fee policy and sending the money to a seller's account when the buyer terminal reports approval in response to the payment.

11. The method of claim 9, further comprising:
paying a participation fee at least one of when the quotation request is received from the buyer terminal and when there is a quotation from a seller terminal.

12. A recording medium having a computer-readable program stored thereon for performing the method of claim 1.

13. An on-line market system comprising an on-line market server for supporting electronic commerce on the Internet, the on-line market server comprising at least one computer system, including at least one processor,
wherein the on-line market server comprises a controller for brokering electronic commerce based on a quotation request including a seller setting from a buyer terminal and a quotation from a seller terminal responding to the quotation request, and
the controller manages the quotation request and quotation history information related to the quotation in a database for buyer reference in producing subsequent quotation requests, and provides to the seller terminal buyer reliability information based on the quotation history information together with the quotation request for seller reference in producing a quotation.

14. An on-line market system that supports electronic commerce, the system comprising at least one computer, including at least one processor, the system further comprising:
a quotation history manager for providing quotation history information for merchandise stored in a database, in response to a request for a quotation history for the merchandise;
a seller setting unit for providing seller reference information related to the merchandise when producing a quotation request is attempted with form and content based on the quotation history information; and a quotation request manager for receiving the quotation request including a seller setting based on the seller reference information, publishing the quotation request to relevant sellers, and managing negotiation with a buyer for a quotation from a seller.

15. The system of claim 14, wherein when the quotation request manager provides the quotation request to a seller terminal, the quotation history manager provides to the seller terminal buyer reliability information based on quotation history information for other goods or services.

16. The system of claim 14, further comprising:
a quotation condition setting unit for providing, to the quotation request, an input field for at least one of a price of merchandise (goods or services), directly input quotation conditions, and selection options when there is an attempt to produce the quotation request by the buyer terminal.

17. The system of claim 16, further comprising:
an automatic quotation processor for automatically producing a quotation when the quotation request includes quotation conditions selected in the field for the selection option and there is an automatic request for quotation from a seller terminal.

* * * * *